United States Patent [19]

Heimann

[11] 4,304,149

[45] Dec. 8, 1981

[54] SYNTHETIC PLASTIC END FITTING FOR BRAKE CABLE ASSEMBLIES

[75] Inventor: Robert L. Heimann, Huntsville, Mo.

[73] Assignee: Orscheln Co., Moberley, Mo.

[21] Appl. No.: 73,076

[22] Filed: Sep. 6, 1979

[51] Int. Cl.³ .............................................. F16C 1/10
[52] U.S. Cl. ................................. 74/501 R; 74/501 P
[58] Field of Search ................. 74/501 R, 501 P, 502, 74/487, 501.5 R, 82; 403/197; 285/162; 151/41.75; 277/24, 50, 207 A

[56] References Cited

U.S. PATENT DOCUMENTS

| | | | |
|---|---|---|---|
| 3,139,768 | 7/1964 | Biesecker | 74/501 P |
| 3,205,727 | 9/1965 | Sevrence | 74/501 R |
| 3,221,572 | 12/1965 | Swick | 74/501 R |
| 3,380,318 | 4/1968 | Henning | 74/501 R |
| 3,940,155 | 2/1976 | Baumle | 277/207 A |
| 4,074,945 | 2/1978 | Kraus | 74/501 R |

FOREIGN PATENT DOCUMENTS

| | | | |
|---|---|---|---|
| 1129344 | 5/1962 | Fed. Rep. of Germany ... | 277/207 A |
| 2314598 | 10/1973 | Fed. Rep. of Germany .... | 74/501 R |
| 609617 | 9/1960 | Italy ................................. | 74/501 R |

Primary Examiner—Kenneth Dorner
Attorney, Agent, or Firm—Laubscher & Laubscher

[57] ABSTRACT

An end fitting is disclosed for mounting a brake cable assembly in an opening contained in a fixed support, which brake cable assembly includes an inner cable member and a tubular concentrically arranged outer sheath member. The fitting includes a tubular body member formed of synthetic plastic material and containing a longitudinal through bore for receiving the inner cable member. At one end, a first counterbore is provided for receiving one end of the outer sheath member, annular seal means being provided at the other end of the body member for concentric engagement with the periphery of the inner cable member. In one embodiment, the annular seal means has a tubular configuration, and in another embodiment, the seal means comprises an O-ring. Convergent annular scraper means may be provided at the aforementioned other body member end for scraping engagement with the periphery of the inner cable member.

7 Claims, 23 Drawing Figures

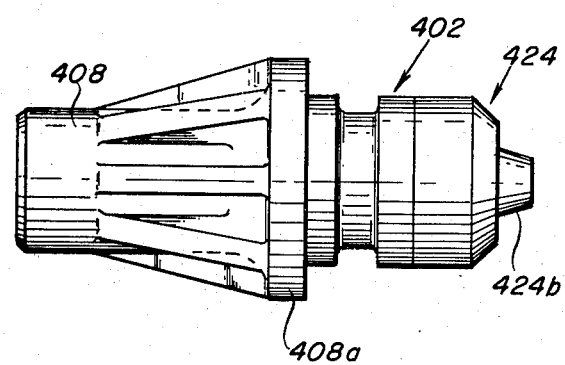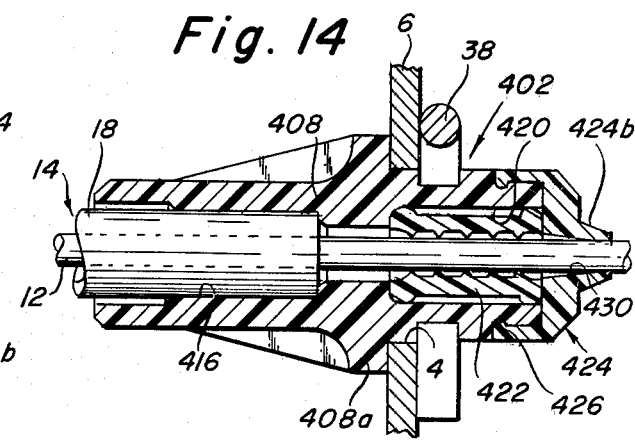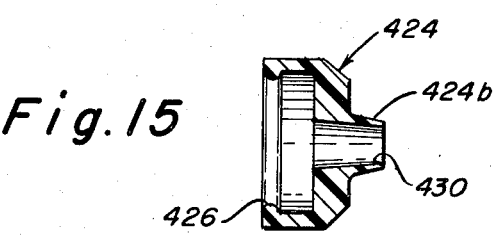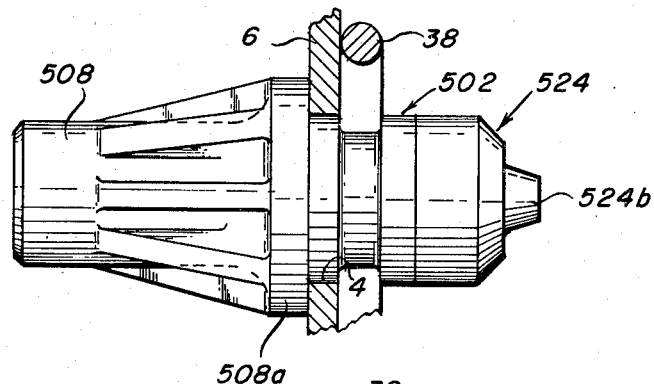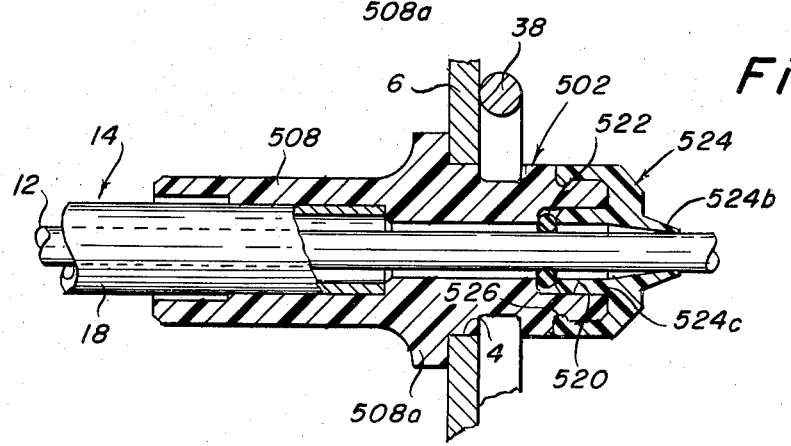

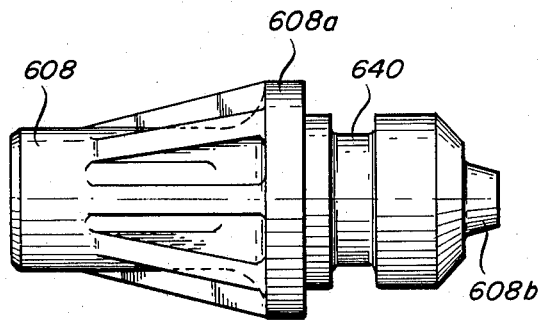
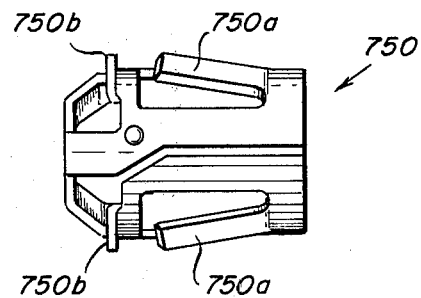
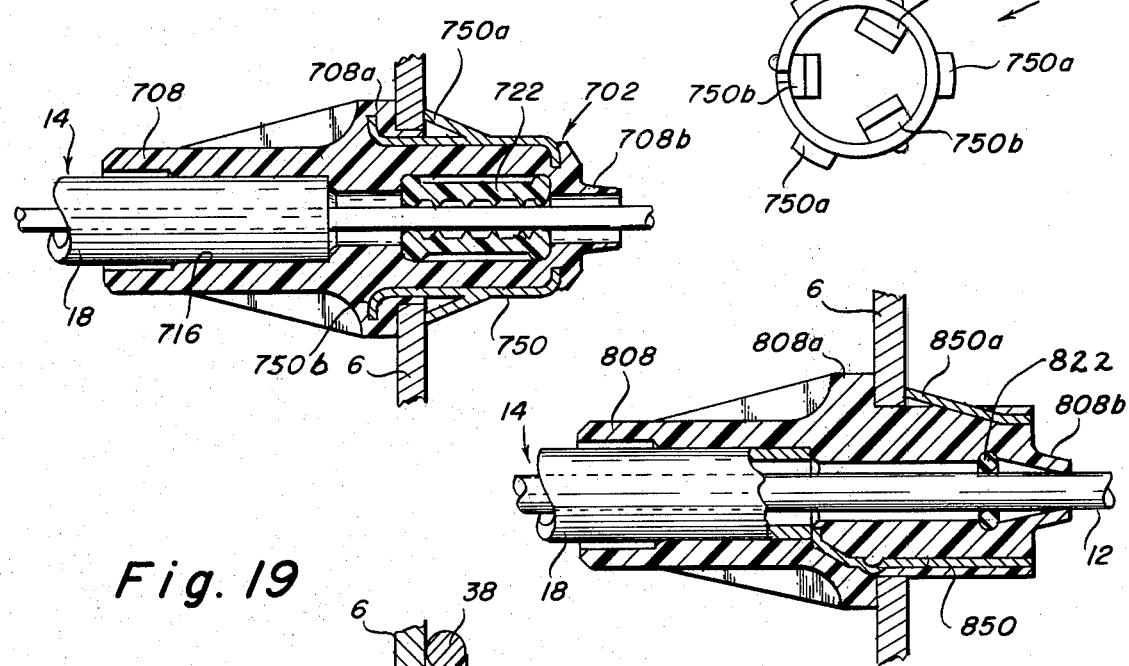
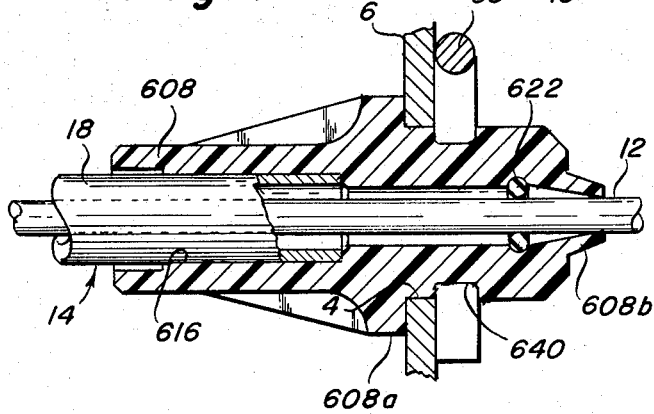

SYNTHETIC PLASTIC END FITTING FOR BRAKE CABLE ASSEMBLIES

BRIEF DESCRIPTION OF THE PRIOR ART

End fittings for mounting brake cable assemblies within an opening contained in a support are well known in the prior art, as evidenced by the prior U.S. Patents to Brickman No. 2,954,248, Benham No. 3,101,205, Swick No. 3,221,572, Sevrence No. 3,366,405, Chatham No. 3,415,549, Hamilton No. 3,542,980, Kraus No. 4,074,945 and Gordy et al No. 4,131,379 (the latter being assigned to the same assignee as the instant invention).

In the aforementioned Hamilton Patent No. 3,542,980, the fitting includes a one-piece body member molded from a synthetic plastic material, and the use of resilient grommets or sleeves is taught by Swick and Chatham. The sleeve of Swick is provided with a flashing lip portion which retains grease on the cable for lubricated movement thereof relative to the concentrically arranged outer sleeve member. Furthermore, the use of annular seal means in combination with scraper for sealing the space between an inner rod member and a concentrically arranged outer sleeve member is broadly disclosed in the U.S. Patent to Muntjanoff et al No. 4,093,241.

SUMMARY OF THE INVENTION

The present invention was developed to provide an improved economical brake cable end fitting that not only affords a greater sealing capacity of the annular space between the inner cable and concentrically arranged outer sleeve components of the brake cable assembly, but also is easily connected with, and more positively retained within, an opening contained in a fixed support.

Accordingly, a primary object of the present invention is to provide an improved end fitting that includes a rigid body member formed of a suitable synthetic plastic material (such as nylon) that contains a through bore one end of which is counterbored to define a first counterbore for receiving one end of the outer sleeve member of the cable assembly when the protruding end of the inner cable member is inserted through the bore. Annular seal means (formed of a resilient material such as rubber, neoprene or the like) are mounted in the bore concentrically about, and in engagement with the periphery of the inner cable member, thereby to retain grease or other lubricant in the annular space between the cable assembly components, and to prevent particles of impurities from entering this space. In one embodiment, these seal means are mounted in a second counterbore at the other end of the body member, a seal-retaining cover member being connected with said other body member end by a snap-fit connection to retain the seal means in place. In another embodiment, the annular seal means are initially molded in place within the bore during the molding of the end fitting body member.

In accordance with a more specific object of the invention, scraper means are provided at the said other end of the body member for scraping particles of dirt and contaminates from the inner cable member, thereby cooperating with the annular seal means to prevent impurities from entering the annular space between the inner cable and outer sleeve components of the brake cable assembly. The scraper means comprise an annular convergent frusto-conical scraper portion arranged concentrically about the inner cable member, which scraper portion has a minimum diameter that is generally equal to that of the inner cable member. The scraper portion may be formed either integrally with the tubular body member, or on the seal-retaining cover member that is connected with the body member by a snap-fit connection.

According to a further object of the invention, retaining means are provided for positively retaining the fitting in a support opening. To this end, the body member includes an outer circumferential flange for engaging one surface of the support, retaining fingers being provided at the other end of the body member for engaging the other support surface. In one embodiment, the retaining fingers are carried by the seal retaining cover, and in the preferred embodiment, the retaining fingers are formed from a tubular metal sleeve that is embedded in the synthetic plastic body member.

BRIEF DESCRIPTION OF THE DRAWING

Other objects and advantages of the invention will become apparent from a study of the following specification when viewed in the light of the accompanying drawing, in which:

FIGS. 13 and 14 are elevational and sectional views, respectively, of a modification of the end fitting of FIGS. 1 and 2, the cover member being provided with inner cable scraper means, and FIG. 15 is a sectional view of the cover member of FIG. 14;

FIGS. 16 and 17 are elevational and sectional views, respectively, of a modification of the end fitting of FIGS. 13 and 14;

FIGS. 18 and 19 are elevational and longitudinal sectional views, respectively, of an embodiment of the invention in which the scraper means are integral with the synthetic plastic fitting body;

FIG. 20 is a longitudinal sectional view of a further embodiment of the invention;

FIGS. 21 and 22 are elevational and right hand end views, respectively, of the retaining finger metal sleeve means of FIG. 20; and FIG. 23 is a longitudinal sectional view of a modification of the end fitting of FIG. 20.

DETAILED DESCRIPTION

Figure 1:
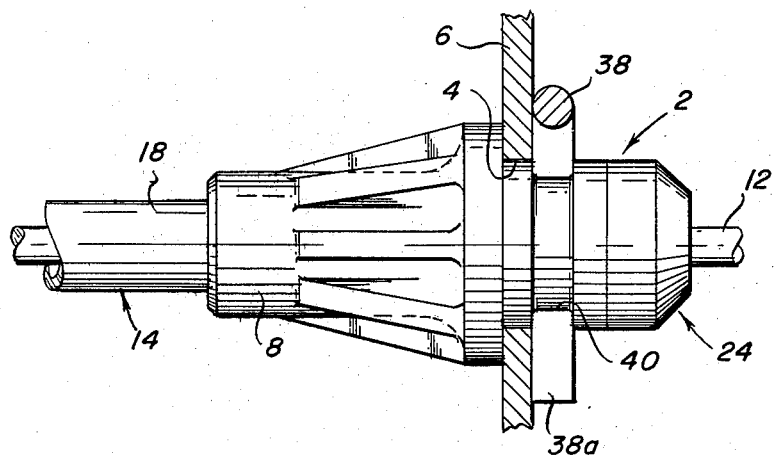
FIGS. 1 and 2 are elevational and longitudinal sectional views, respectively, of a first embodiment of the invention.
Figure 2:
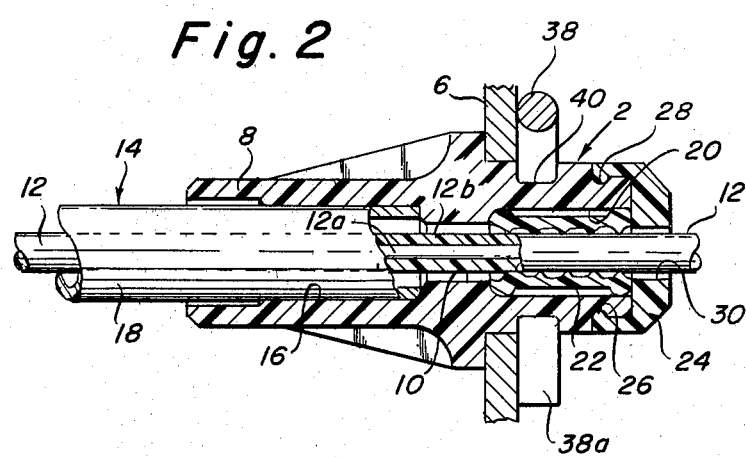
Figure 4:
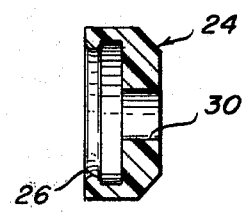
FIGS. 3-5 are sectional views of the body member, seal-retaining cover member, and tubular seal component of the end fitting assembly of FIG. 2.

Referring first more particularly to FIGS. 1-5, the end fitting 2 is adapted for mounting in an opening 4 contained in a fixed support 6, which end fitting includes a body member 8 formed of a rigid synthetic plastic material, such as nylon (i.e., high impact base type 66 nylon), DuPont Zytel, Teflon or the like. The body member 8 contains a through bore 10 that receives the inner cable member 12 of a brake cable assembly 14. As is customary in the art, the inner cable member includes a center metal strand portion 12a, and a protective liner portion 12b formed of synthetic plastic material, such as acetal resin (Celcan), Delrin, or the like. At one end, the body member contains a first counterbore recess 16 that receives (preferably with an interference fit) the end portion of the outer sleeve member 18. At its other end, the body member contains a second counterbore 20 that receives a resilient tubular seal member 22 formed of natural or synthetic rubber, neoprene or the like. The seal member 22 is retained in the second counterbore 20 by a synthetic plastic (i.e., nylon) annular cover member 24 that is connected with said other end of the tubular body member 8 by a snap-fit connection including annular rib 26 on the cover member, and a corresponding annular groove 28 contained in the outer periphery of the body member 28. The bore 30 of the cover member 24 is slightly greater than the diameter of the inner cable member 12.

Figures 3, 5:
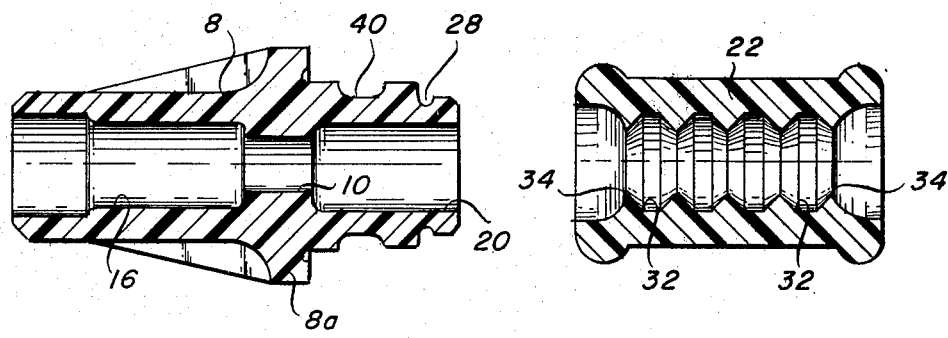
Figure 6:
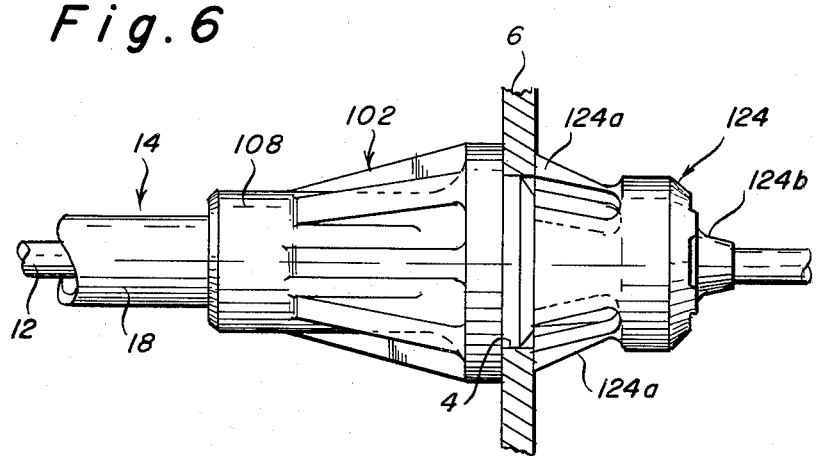
FIGS. 6 and 7 are elevational and longitudinal sectional views, respectively, of a modification of the invention of FIGS. 1 and 2.

As shown in FIG. 5, the tubular resilient seal member 22, which has an internal diameter equal to that of the inner cable member 12, is provided on its inner surface with a plurality of annular recesses 32 having divergent walls that define longitudinally spaced annular ridges 34 that circumferentially engage the outer periphery of the inner cable member 12, thereby to retain lubricant in the annular space between the inner and outer cable members, and also to prevent undesirable particles of impurities from entering this annular space.

As is known in the art, the end fitting 2 is retained in the support opening 4 by the cooperation, on the one hand, of annular flange portion 8a, which extends circumferentially about the body member 8, with one face of the support 6, and, on the other hand, a U-shaped resilient clip member 38 having leg portions 38a that extend in a corresponding external groove 40 on the body member 8, which clip member cooperates with the other surface of the support.

Thus, in the embodiment of FIGS. 1-5, the synthetic plastic fitting affords an efficient seal for the space between the inner and outer cable members, which fitting is positively retained in place by the U-shaped resilient clip 38.

Referring now to the embodiment of FIGS. 6-9, the synthetic plastic seal-retaining cover member 124 is connected with the right-hand end of synthetic plastic body member 108 by a snap-fit connection defined by the cooperation between annular rib 126 on the inner circumference of the cover member, and external rib 129 on the body member 108, thereby retaining the resilient seal member 122 within the second counterbore recess 120. In this embodiment, the means for retaining the end fitting in the support opening 4 includes an annular flange 108a on the outer circumference of the body member 108, and a plurality of outwardly extending retaining fingers 124a that are integral with the cover member 124 and extend outwardly generally axially toward the left-hand end of the body member 108 for engagement with the corresponding surface of support 6. Therefore, the circumferential flange 108a and the retaining fingers 124a engage opposite sides of the support 6 to retain the end fitting in the support opening 4.

Figure 7:
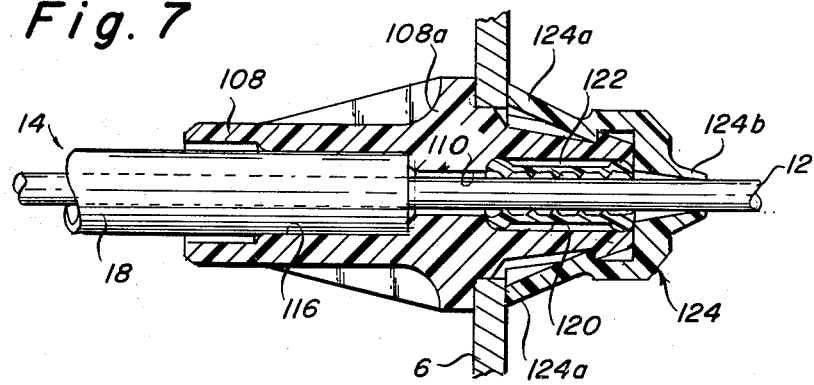
Figure 8:
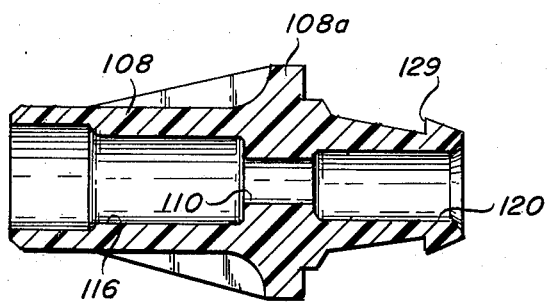
FIGS. 8 and 9 are longitudinal sectional views of the tubular body and cover members of FIG. 7.
Figure 9:
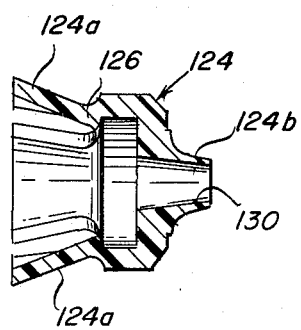

It will be noted in FIGS. 7 and 9 that the right-hand end of the cover member 124 is provided with a frustoconical portion 124b that converges toward the inner cable member 12. In the illustrated embodiment, the minimum diameter of the frustoconical portion is slightly greater than the diameter of the inner cable member 12. As will be developed in greater detail below, if the minimum diameter of the frustoconical converging portion approximates the diameter of the inner cable member, a scraping action is produced to remove particles from the inner cable member 12 and thereby further isolate the annular space between the inner and outer components of the brake cable assembly.

Figure 10:
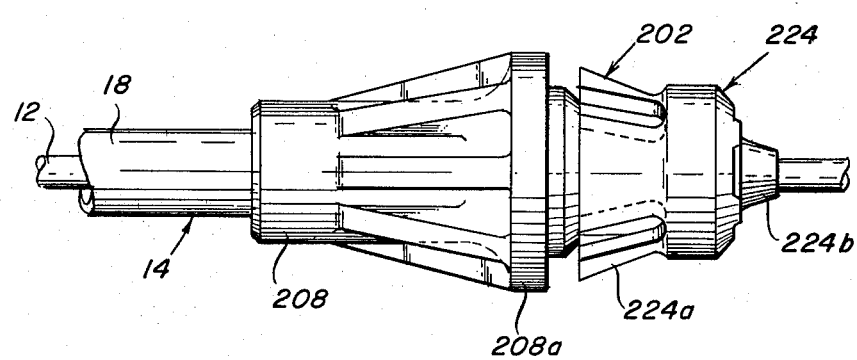
FIGS. 10 and 11 are elevational and sectional views, respectively, of a modification of the embodiment of FIGS. 6 and 7.
Figure 11:
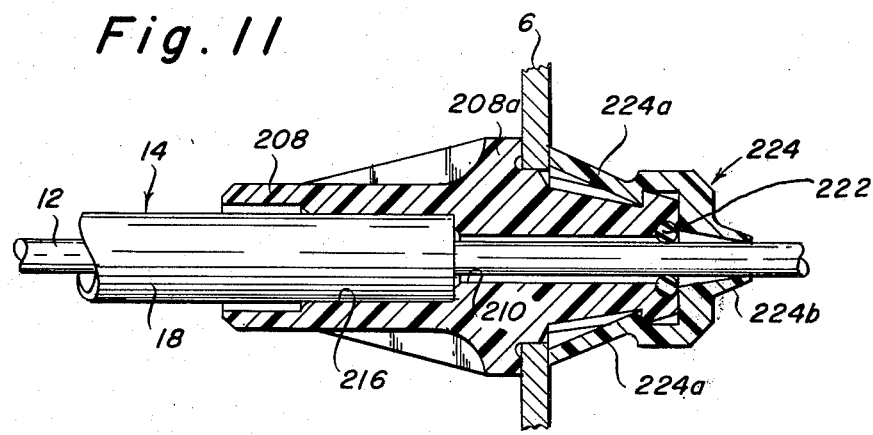

In the modification of FIGS. 10 and 11, the tubular seal means 122 of the embodiment of FIG. 7 has been replaced by a conventional resilient O-ring 222 that is retained in a corresponding second counterbore in the right-hand end of the synthetic plastic body member 208 by the synthetic plastic cover member 224 that is connected with the body member by a snap-fit connection.

Figure 12:
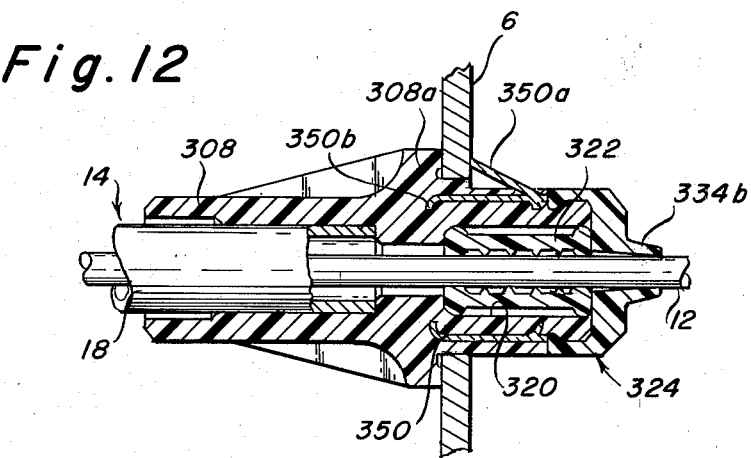
FIG. 12 is a modification of the end fitting of FIGS. 1 and 2 including retaining finger means formed on a separate metallic sleeve.

Referring now to the embodiment of FIG. 12, the seal means 322 is of the tubular configuration and is retained in the second counterbore recess 320 by the snap-fit cover member 324. In this embodiment, the retaining finger means are defined by integral fingers 350a that are partially punched outwardly from a metallic spring steel tubular member 350 that is embedded in the synthetic plastic body member 308. Thus, the retaining finger means 350a—that are circumferentially spaced about the metal tubular member 350—extend outwardly generally axially toward the left-hand end of the tubular body member 308, thereby to engage the surface of support member 6 that is on the opposite side of the surface that is engaged by circumferential flange 308a of the body member 308. The metallic sleeve 350 is provided with inwardly bent tab portions 350b that retain the metallic sleeve member against axial displacement relative to the synthetic plastic body member 308. The structure of the metallic sleeve member 350 is similar to that which will be described below with reference to FIGS. 20-23.

The embodiment of FIGS. 13-15 corresponds generally with that of FIGS. 6-9, the only difference being that instead of having a plurality of retaining fingers provided on the cover member 424, a conventional U-shaped resilient clip 38 is provided for retaining the end fitting within the support opening 4. The snap-fit cover member 424 retains the resilient tubular seal member 422 within the second counterbore recess 420.

Referring now to the embodiment of FIGS. 16 and 17, the annular seal means 522 comprises an O-ring formed of resilient material, such as Neoprene, rubber or the like, that is maintained against the end wall of the second counterbore recess 520 by an annular central projecting portion 524c on the cover member 524. Thus, when the cover member 524 is brought into snap-fit connection with the synthetic plastic body member 508, the central annular projecting portion 524c of the cover member 524 forces the O-ring seal member 522 into the bottom of the second counterbore recess 520, thereby positively maintaining the seal means 522 in a position to isolate the annular space between the inner and outer cable components against particles of impurities and other contamination.

Referring now to the embodiment of FIGS. 18 and 19, the synthetic plastic body member 608 is of integral one-piece construction that is maintained in position within the support opening 4 by the cooperation between circumferential annular flange portion 608a on the one hand, and U-shaped spring clip 38, on the other hand, that engages external groove 640 on the body member for engagement with the opposite surface of support member 6. In this embodiment, the O-ring seal member 622 is embedded within the tubular body member 608 during the initial molding thereof. In this embodiment, the right-hand extremity of the body member 608 terminates in a converging frustoconical portion 608b the minimum diameter of which corresponds with the diameter of the inner cable member 12, whereby the converging frustoconical portion serves as a scraper device for scraping from the inner cable member scale and other accumulated particles of impurities. Thus, both the scraper portion 608b and the resilient O-ring seal member 622 serve to retain lubricant within the space between the inner and outer components of the cable assembly, and also to isolate this annular space from external particles of impurities.

Referring now to the embodiment of FIGS. 20-22, the fitting body 708 is formed of synthetic plastic material and has embedded therein a tubular seal member 722 formed of a suitable resilient material such as Neoprene. Also embedded concentrically within the fitting body 708 is a metallic retaining sleeve 750 that is formed of spring steel or the like, which retaining member is generally of the configuration illustrated in the aforementioned Gordy et al U.S. Pat. No. 4,131,379. More particularly, the retaining sleeve member includes circumferentially-spaced outwardly extending retaining fingers 750a that extend toward the left-hand end of the fitting for engagement with the rear surface of support member 6, thereby cooperating with the annular circumferential flange portion 708a of the fitting body to retain the fitting in the support opening. At its left-hand end, the metallic retaining sleeve 750 includes circumferentially-spaced radially outwardly extending tab portions 750b that prevent axial displacement of the metallic sleeve member relative to the synthetic plastic fitting body 708.

Referring now to the embodiment of FIG. 23, the fitting body 808 is again of integral one-piece construction and is initially molded to have embedded therein the O-ring seal member 822, the inner diameter of which corresponds with the diameter of the inner cable member 12. In this embodiment, the right-hand end portion 808b of the fitting body is of convergent frustoconical configuration, the minimum diameter of frustoconical portion 808b corresponding with the diameter of inner cable component 12. Consequently, the scraper portion 808b will scrape scale and other contaminates from the inner cable component 12, and thereby cooperate with the seal member 822 to prevent particles of impurities from entering the annular space between the inner and outer components of the cable assembly.

While in accordance of the provisions of the Patent Statutes, the preferred forms and embodiments of the invention have been illustrated and described, it will be apparent to those skilled in the art that various changes and modifications may be made without deviating from the inventive concepts set forth above.

What is claimed is:

1. An end fitting for connecting in an opening contained in a fixed support a brake cable assembly including an inner cable member and a concentrically arranged tubular outer sheath member, comprising
   (a) a tubular body member formed of rigid synthetic plastic material and containing a central through bore the diameter of which is at least as great as that of said inner cable member;
      (1) said body member containing at one end a first counterbore recess the diameter of which corresponds generally with the outer diameter of said sheath member, whereby the cable assembly may be introduced through said body member one end to a position in which one end of the outer sheath member extends within and terminates in said first counterbore recess, and in which the inner member extends completely through said body member central through bore;
      (2) said body member containing at its other end a second counterbore recess;
   (b) resilient annular seal means mounted in said body member second counterbore recess for concentric engagement with the peripheral surface of, and having an inner diameter corresponding with the diameter of, said inner cable member; and
   (c) cover means for retaining said seal means in said second counterbore recess, said cover means including
      (1) a cover member containing a central opening for receiving the inner cable member; and
      (2) means defining a snap-fit connection between one end of said cover member and said body member other end.

2. A fitting as defined in claim 1, wherein the other end of said cover member has an annular frustoconical convergent scraper portion extending concentrically about, and having a minimum diameter which corresponds generally with that of, the inner cable member, whereby said scraper portion is in scraping engagement with said inner cable member.

3. A fitting as defined in claim 1, wherein said seal means comprises a resilient tubular seal body the outer diameter of which corresponds generally with the diameter of said second counterbore recess, the inner diameter of said tubular seal body corresponding with that of the inner cable member, the inner surface of said tubular seal body containing a plurality of longitudinally spaced recesses defining annular lubricant-receiving chambers in said tubular seal body.

4. A fitting as defined in claim 1, wherein said seal means comprises an annular resilient O-ring.

5. A fitting as defined in claim 1, wherein said body member has an external annular circumferential flange portion adapted to abut one face of the fixed support when the body member is mounted in the support opening, and retaining means connected with one of said body and cover members for engagement with the other face of said fixed support, thereby to retain said body member in said support opening.

6. A fitting as defined in claim 5, wherein said retaining means comprises a plurality of circumferentially-spaced outwardly-extending retaining fingers carried by and integral with said cover member, said retaining fingers extending generally in the direction of said one body end.

7. A fitting as defined in claim 5, wherein said retaining means comprises an annular metallic member mounted concentrically with respect to said body member, said metallic member including a plurality of circumferentially-spaced retaining fingers extending outwardly from said body member generally axially in the direction of said one body end.

* * * * *